United States Patent [19]
Conley

[11] 3,993,285
[45] Nov. 23, 1976

[54] DOUBLE DISC GATE VALVE WITH ENTRAPPED STEM CONNECTION

[75] Inventor: Richard William Conley, Pittsburgh, Pa.

[73] Assignee: Rockwell International Corporation, Pittsburgh, Pa.

[22] Filed: Aug. 18, 1975

[21] Appl. No.: 605,278

[52] U.S. Cl. ............................ 251/86; 251/267; 251/327; 251/328; 251/329
[51] Int. Cl.² .................................... F16K 25/00
[58] Field of Search ............... 251/86, 87, 327, 328, 251/329, 267

[56] References Cited
UNITED STATES PATENTS

| | | | |
|---|---|---|---|
| 1,922,190 | 8/1933 | Atterbury | 251/267 X |
| 2,868,495 | 1/1959 | Lucas | 251/86 |
| 2,905,192 | 9/1959 | Velan | 251/267 X |
| 3,282,559 | 11/1966 | Bredtschneider | 251/327 |
| 3,400,441 | 9/1968 | Fryling | 251/327 X |
| 3,463,446 | 8/1969 | Natho | 251/327 X |

*Primary Examiner*—Harold W. Weakley

[57] ABSTRACT

A gate valve includes a pair of identically shaped tapered discs defining a tapered self-locking axially translatable gate wherein each disc has an annular hardened seating surface which engages the mating surfaces on the valve body adjacent the flow ports. Tongues on the sides of the discs ride in vertical grooves on the valve body as the gate travels between a raised open and a lowered closed position. The discs of the gate are provided with a slot transverse to the flow ports which captures a T-head on the stem assembly, the slot being positioned in the gate interior radially within the seating contact area to thereby reduce the overall height of the valve.

2 Claims, 8 Drawing Figures

DOUBLE DISC GATE VALVE WITH ENTRAPPED STEM CONNECTION

BACKGROUND OF THE INVENTION

1. Field of the Invention

This invention relates to gate valves and in particular to a gate valve construction using a split gate construction.

2. Description of the Prior Art

Double disc gates have been proposed for gate valves because of certain inherent functional and manufacturing advantages. Such constructions, in view of the larger freedom of movement of the independent discs, can conform to larger manufacturing variations in the discs and the valve seats while, at the same time, provide complete sealing despite distortion of the seats due to differential heating and cooling rates and system stresses. The present invention seeks to improve upon prior double disc constructions by providing a unit which has additional manufacturing, performance and reliability features.

SUMMARY OF THE INVENTION

The gate of the present valve comprises two juxtaposed identically formed discs. In assembly, the discs are fitted together by an interlocking segmented hub on the inner faces thereof and spaced a predetermined distance apart by an annular spacer ring. The individual discs allow independent axial flexing such that despite dimensional and angular variations between the respective seating surfaces and the valve seats the downstream seat can independently conform to its seating surface. The spacer ring surrounds and is captured in the segmented hub. The spacer ring, more importantly, establishes the desired overall width of the gate. In this manner, the spacer ring can be appropriately independently sized and selected to accommodate various tolerances in the individual disc while still providing a predetermined overall width necessary to ensure sealing mating of the seating surfaces in the valve closed position. Additionally, when the valve seats and seating surfaces become scored or otherwise damaged such that regrinding is necessary, the amount of removed material can be compensated for by increasing the width of the spacer ring to once again re-establish the desired relationship between the seating surfaces in the fully closed position. The spacer ring has a substantially smaller diameter than the seating surfaces to increase the disc deflection capability.

The discs additionally include slots transverse to the flow passage which capture a T-head end of a non-rotating valve stem. Because the disc or wedge is larger at the top than the bottom, sufficient material exists for forming cavities transverse to the valve seating surfaces while being located radially therewithin. In contrast to conventional gate valves wherein the slot for the T-head is parallel to the fluid flow, the entire stem head retaining section is exterior of the valve seating surfaces, this adds considerably to the height of the valve and, as a consequence, the present design is considerably more compact. Further fracture of the stem presents the possibility that the stem end will enter the flow line. This possibility is precluded by the present captured design. The individual gate discs ride up and down the valving control chamber by cooperation between guide tongues formed at the sides of the discs and recessed guide rails formed on the sides of the valve body. This provides for guided controlled axial movement of the gate assembly between the open position and the closed position. With the aforementioned stem connection oriented perpendicular to the flow line, rather than parallel to it, there are no reactive forces on the discs causing relative rotation of the two valve discs. Accordingly, no pin connection or the like is necessary.

The above and other features of the present invention will be apparent to those skilled in the art upon reading the following detailed description, reference being made to the drawings in which.

DESCRIPTION OF THE PREFERRED EMBODIMENTS

Figure 1:
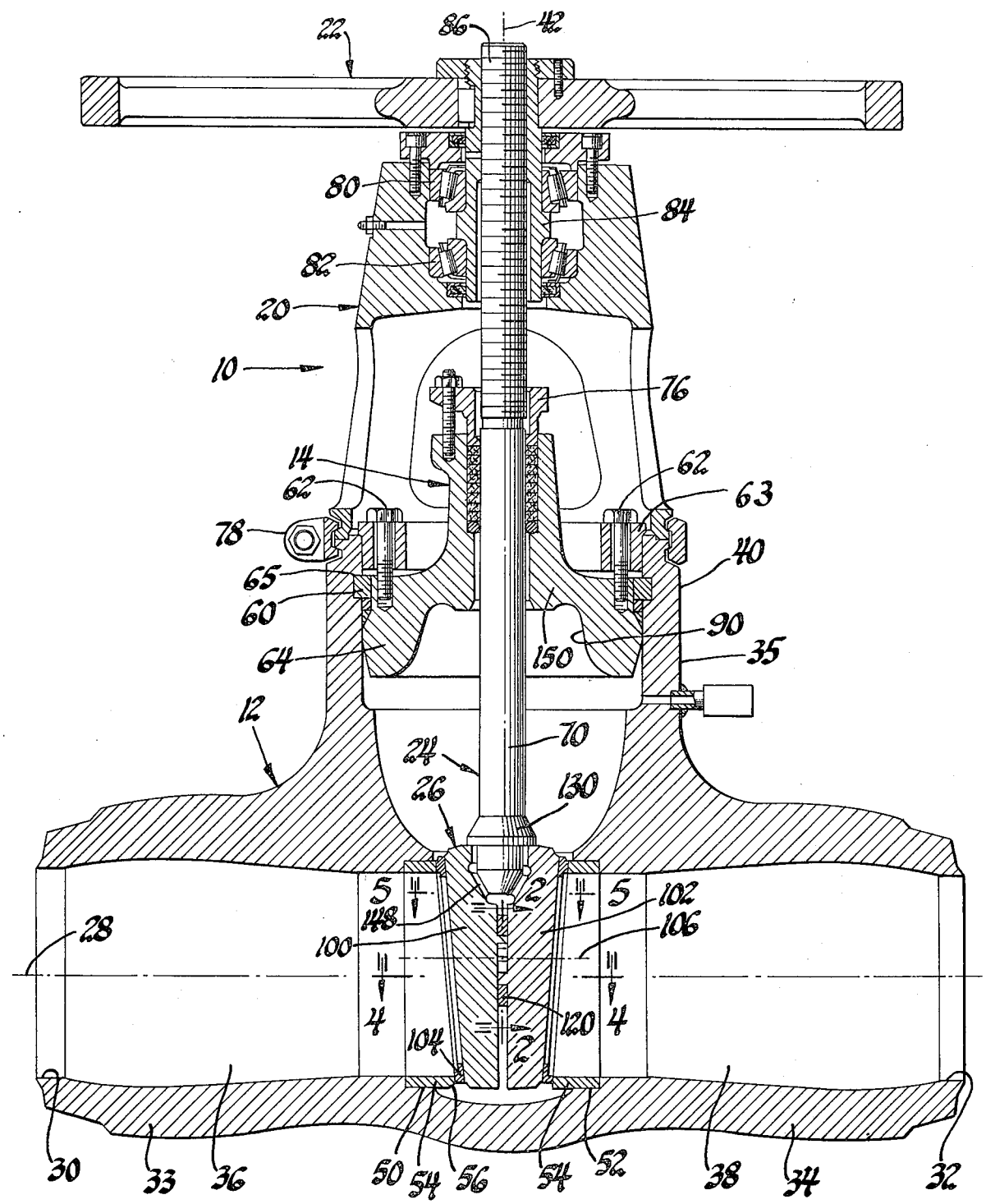
FIG. 1 is a cross-sectional view of a gate valve made in accordance with the present invention, showing the two piece gate in the closed position.

Referring to FIG. 1, there is shown a gate valve 10 made in accordance with the present invention of the type used for high pressure fluid applications such as electric power generation systems of either the fossil and nuclear type. Such a gate valve is useable in a product line ranging between nominal sizes of 1½ inches and 42 inches and in ANSI pressure classes of 600, 900, 1500, 2500 and 4500.

The gate valve 10 generally comprises a valve body 12, a bonnet assembly 14, a yoke assembly 20 and a handwheel assembly 22. As hereinafter described, rotation of the handwheel assembly 22 raises and lowers an internal stem assembly 24 and a double disc gate 26 to open and close a fluid passage extending through the valve body 12 along axis 28 between a left hand outlet 30 and a right hand outlet 32. The direction of flow is dependent on the system and the present equally facilitates flow in either direction.

The valve body 12 is a generally T-shaped cast carbon steel construction and includes outlet sections 33 and 34 and a control section 35 mutually intersecting at a valving chamber occupied by the gate 26. The section 33 includes the aforementioned outlet 30 and a flow passage 36. The section 34 includes the aforementioned outlet 32 and a flow passage 38. The passages 36 and 38 are co-axially disposed along the flow axis 28. The end of control section 35 defines an upwardly opening cylindrical section 40 having an operational axis 42 which perpendicularly intersects the flow axis 28.

Figure 4:
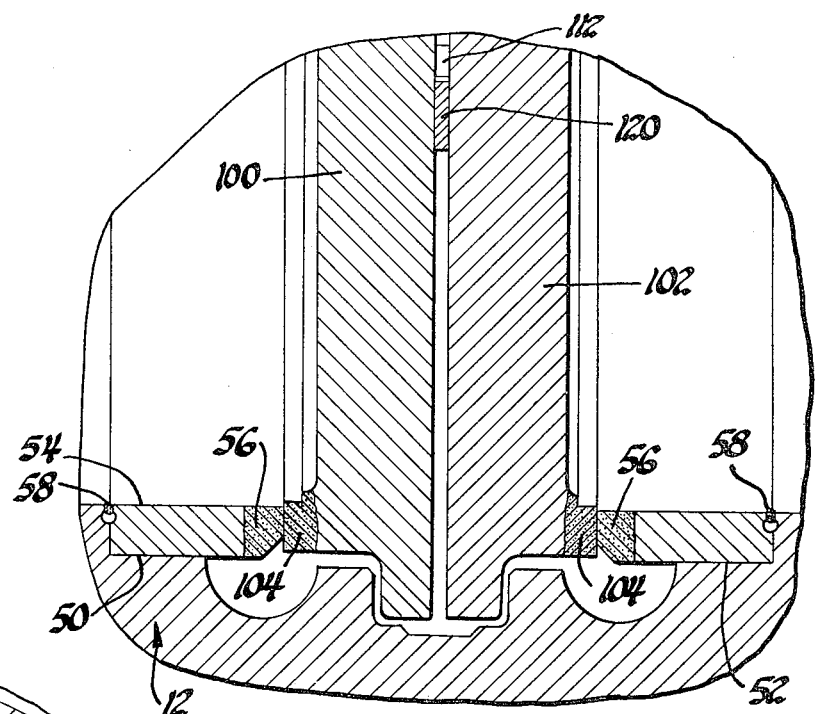
FIG. 4 is a view taken along line 4—4 of FIG. 1, showing the tongue and groove guides between the gate and the valve body.

The inner ends of the sections 33 and 34 are formed with counterbores 50 and 52 which contain cylindrical seat rings 54. The seat rings 54 are provided with hardened annular seats 56 (FIG. 4). The seats 56 are formed in planes inclined five degrees with respect to the operational axis 42. The planes of the seats 56 are symmetrically disposed with respect to the axes 42 and 28. The seat rings 54 are fixed to the inner surface of the valve body 12 at continuous circumferential welds 58.

The bonnet assembly 14 is retained at the upper end of the section 40 on the outer end of the section 35 by means of a split retainer ring 60. Bolts 62 clamp the ring 60 to draw the outer flange 63 of the bonnet 64 upwardly against the retainer ring retained in a peripheral circumferential channel section 65. The bonnet 64 is centrally apertured and receives the stem 70 of assembly 24. The handwheel assembly 22 is attached at its outer end to the stem assembly 24 and to at its lower end the gate 26. A packing gland assembly 76 seals the periphery of the stem 70.

The yoke assembly 20 is retained at the top of section 35 by means of a split yoke lock ring 78. A pair of roller bearings 80 and 82 have their outer races received in counterbores at the upper end of the yoke 20 and have their inner races fixedly carried at opposite ends of rotatable bushing 84 which has an internal thread engaging the threaded end 86 of the valve stem 70. The bushing 84 is keyed to the handwheel 22 such that rotation of the handwheel 22 rotates the bushing 84 to raise and lower the stem 70 through the packing assembly 76, thereby, raising and lowering the gate 26 between the illustrated lowered closed position and a raised opened position wherein the gate 26 is housed within a generally hemispherical depression 90 in a lower surface of the bonnet 64 so as to reduce the vertical height of the valve.

The gate assembly 26 comprises two identically formed gate discs 100 and 102. In assembly the discs 100 and 102 have opposed seating surfaces hereinafter described which sealingly engage the seats 56 of the seat rings 54 to prevent migration of fluid past the sealing interfaces. Each disc has a projecting hardened seating surface 104 which is ground flat in a plane inclined with respect to its planar back surface at an angle equal to the inclination of the seat 56 or, in other words, five degrees with respect thereto. The outer diameter of the surface 104 is slightly larger than the surface 56. In initial assembly, in the fully seated closed position, the overall thickness of the wedge is sized such that the axis 106 of the wedge assembly is located above flow axis 28. As the seating surfaces wear, the axis 106 will shift downwardly and will maintain complete sealing contact until the outer diameter of surface 104 is unacceptably below the outer diameter of seat 56 at the upper center thereof.

Figure 2:
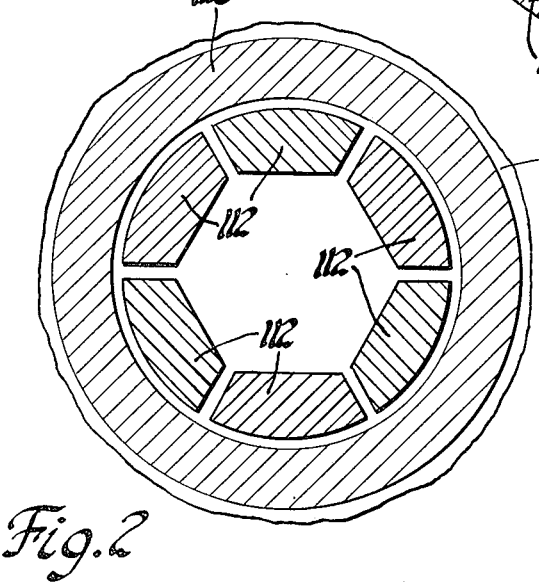
FIG. 2 is a view taken along line 2—2 of FIG. 1, showing the interlocking hub and spacer ring between the valve discs.
Figure 3:
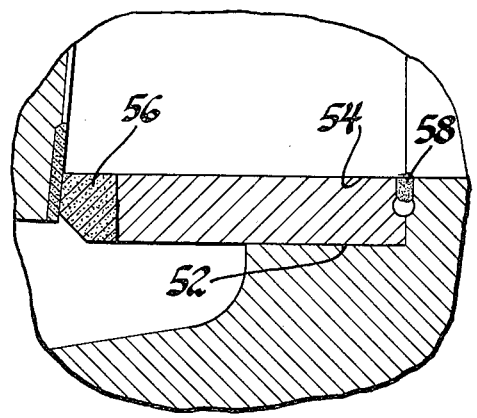
FIG. 3 is a fragmentary view showing the assembly of the seat ring to the valve body and its engagement with the seating surface on the gate disc.
Figure 8:
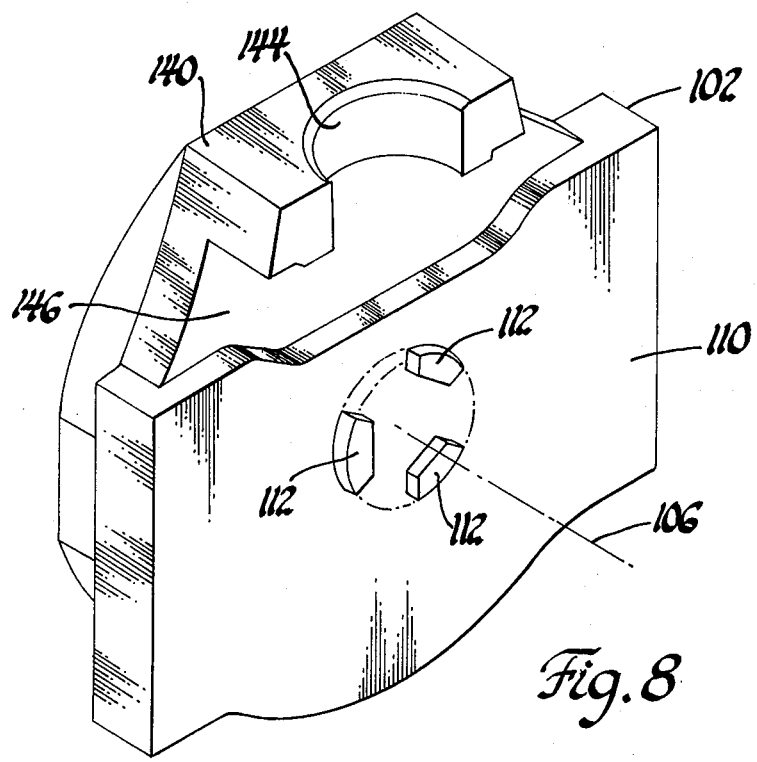
FIG. 8 is an enlarged perspective view of a valve disc illustrating the stem head slot and the segmented locating hub.

Referring to FIG. 8, the rear surface 110 of the gate disc 102 is substantially planar being interrupted only by three projecting segmented lugs 112 equally circumferentially disposed with respect to the axis 106. This arrangement provides an uninterrupted datum surface for convenient accurate machining of the seating surface 104 and other critical machine operations on the individual discs. In assembly, the lugs 112 interfit with corresponding lugs on the juxtaposed gate disc to form a segmented annular hub as shown in FIG. 2. The sides of the individual lugs are formed so as to provide a circumferential spacing with the adjoining lugs such that limited relative movement is accommodated without a corresponding interaction. The segmented hub captures an annular spacer ring 120. The spacer ring 120 has a predetermined thickness which, in combination with the thickness of the individual discs, establishes an overall width for gate 26 sufficient to ensure proper seating of the gate discs against the seats. The ring 120 is substantially smaller in diameter than the seating surfaces to increase the deflection of the latter under pressure and stem loading.

Should excessive wear occur at the seating interfaces or should any of the seating surfaces become scored or otherwise damaged during operation, the gate must be removed and the seating surfaces refinished. Inasmuch as this will result in the removal of metal, there would be excessive downward travel of the gate past the point where sealing contact is established. This would normally necessitate the replacement of the entire gate. In the present instance, however, only the spacer ring 120 must be replaced. The only replacement requirement is that the thickness of the spacer ring compensate for material reduction occasioned by the machining operation so as to re-establish the desired operational relationships between the seating surfaces.

Figure 5:
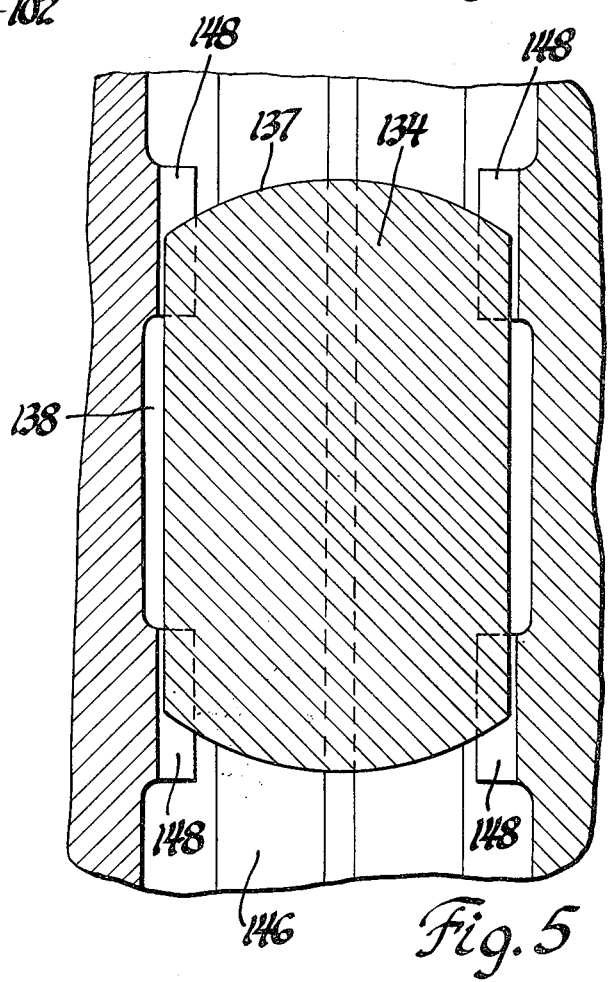
FIG. 5 is an enlarged fragmentary view taken along line 5—5 of FIG. 1, showing the stem head connection at the valve discs.
Figure 6:
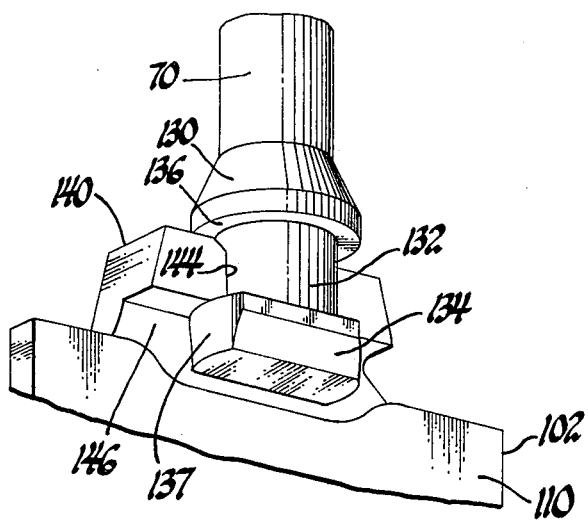
FIG. 6 is an enlarged fragmentary perspective view of the stem head in assembly with the valve discs.
Figure 7:
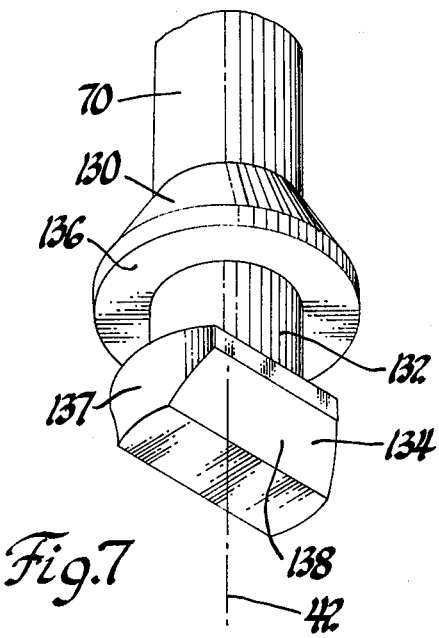
FIG. 7 is an enlarged perspective view of the stem head configuration.

The lower end of the stem 70 is provided with a T-head construction comprising an actuating collar 130, a cylindrical neck 132 and a T-wedge 134. As shown in FIGS. 5, 6 and 7, the collar 130 has a substantially frustoconical surface provided with a lower annular bearing surface 136. The T-wedge 134 has outer faces 137 substantially identical in diameter to the outer diameter of the collar 130 and inclined side surfaces 138 symmetrically disposed with respect to the axis 42 to thereby form a downwardly tapering wedge shaped section.

As shown in FIGS. 6 and 8, the individual discs 102 include an upper bearing surface 140 engageable by the surface 136, a semi-circular axial groove 144 adapted to loosely surround the neck 132 and a wedge shaped transverse slot 146 extending transverse to the axes 106 and 42. The slot is within the confines of the seating areas of the gate, resulting in a lowered profile. Pairs of raised inclined pads 148 are formed at the sides of the slots 146 and operationally have a slight clearance with respect to the inclined surfaces 138 of wedge 134. In assembled relationship as shown partially in FIG. 6, the stem head end is received within the slot 146 and the other half of the gate assembly is received thereover such that the wedge 134 is captured within the confines of the slots 146. The transverse slot design affirmatively retains the stem end and will permit entry thereof to the fluid line in the event of stem fracture.

Due to the wedge shape of the gate 26, the force transmitted by the stem assembly 24 to the seating surfaces is greatly magnified, resulting in a large sealing force between the mating seating surfaces. The independent flexure of the seating surfaces accommodated by the split wedge design allows the individual seating surfaces to flex and conform to the mating surfaces under fluid pressure without a corresponding reaction by the opposite disc. It also substantially equalizes the seating forces on the individual seating surfaces. Accordingly, when it is desired to move the gate assembly to the opposed position, the upper surface of the T-head 134 engages the undersurfaces of the slot 146 and, inasmuch as the discs are independent, the flexure thereby provided relieves the seating force sufficiently to disengage the seating surfaces.

The gate assembly has been translated upwardly through rotation of the handwheel 22 and upward movement of the stem 24 until such time as the conical back seat 130 of the stem 70 engages the back seat 150 on the bonnet 64. Thereat flow through the passages 36, 34 is substantially unrestricted.

It should be noted that only during the final closing and initial opening movement of the gate is there any mechanical or pressure loaded sliding movement of the seating surfaces across the seats, thereby, resulting in reduced cycle wear to these surfaces.

Although only one form of this invention has been shown and described, other forms will be readily apparent to those skilled in the art. Therefore, it is not intended to limit the scope of this invention by the embodiment selected for the purpose of this disclosure but only by the claims which follow.

I claim:

1. A two-piece gate valve comprising: a valve body, end sections on the valve body having a pair of coaxially disposed flow passages, said flow passages having axially spaced inner ends intersecting a valving control chamber, the outer ends of the end sections being connectable to a fluid flow line; a center section on the body perpendicularly intersecting the control chamber; a stem supported on the center section for reciprocative movement along an axis intersecting the control chamber; means operatively associated with the stem for reciprocating the latter along the axis between a raised and lowered position when the stem is held against rotation; annular valve seats surrounding the inner ends of the flow passages adjacent the control chamber, said valve seats being disposed in planes symmetrically converging toward the axis remote from the stem and diametrically opposed with respect to the axis; a gate including first and second gate discs, each disc having an annular seating surface on the front thereof inclined parallel to the opposed valve seats so as to be sealingly engageable therewith in the lowered position; rear surfaces on the discs juxtaposed in assembly parallel to the axis and transverse to the flow line; means associated with the gate discs establishing a predetermined overall width for the gate thereby providing full sealing contact between the annular seating surfaces and the valve seats; tongue and groove means between the discs and the valve body for controlling axial movement of the gate along the axis between the raised and lowered positions; a first groove formed transversely in the rear surface of each of the gate discs radially interior of the valve seat, said first groove having a side surface inclined with respect on the rear surface intersected by a top surface normal to the rear surface; a semicircular groove formed in each gate disc parallel to the rear surface and intersecting the first groove, said second grooves in assembly of the gate defining a circular opening, said first groove in assembly defining a wedge shaped slot having downwardly converging side walls; and an enlarged terminal end in the stem assembly having a first wedge shaped end congruently shaped with respect to the slot and having transverse inclined side surfaces thereon engageable with the transverse inclined surfaces of the slot to effect axial spreading of the discs and forcing the tongues against the sides of the groove such that the torque on the stem is borne thereat so as to hold the stem against rotation, said terminal end engaging the top surfaces of the slot to raise the gate to the closed position and having an intermediate circular portion received within said circular hole whereby the lower end of the stem is fixedly captured by the gate discs notwithstanding fracture from the stem.

2. The gate valve recited in claim 1 wherein a pair of raised pads are formed on the side surfaces of the grooves and operationally have a slight clearance with respect to the inclined side surfaces of the slot and are engaged thereby to effect spreading of the discs.

* * * * *